United States Patent
Zhang et al.

(10) Patent No.: US 7,684,348 B2
(45) Date of Patent: Mar. 23, 2010

(54) METHOD FOR ENSURING SERVICE CLASS OF PACKET SERVICE AND METHOD OF RATE LIMITATION

(75) Inventors: Fan Zhang, Shenzhen (CN); Feng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 11/568,311

(22) PCT Filed: May 17, 2006

(86) PCT No.: PCT/CN2006/001012

§ 371 (c)(1),
(2), (4) Date: Jul. 25, 2008

(87) PCT Pub. No.: WO2007/051374

PCT Pub. Date: May 10, 2007

(65) Prior Publication Data

US 2009/0010161 A1    Jan. 8, 2009

(30) Foreign Application Priority Data

Oct. 31, 2005   (CN) .................. 2005 1 0117076

(51) Int. Cl.
*G01R 31/08* (2006.01)
*H04L 12/28* (2006.01)
(52) U.S. Cl. .................. 370/253; 370/258; 370/452; 370/909; 709/251
(58) Field of Classification Search ............ 370/229, 370/230, 235, 241, 252, 253, 254, 258, 431, 370/449, 450, 451, 452, 909, 216, 221, 222, 370/442; 709/251
See application file for complete search history.

(56) References Cited

U.S. PATENT DOCUMENTS 6,816,494 B1   11/2004  Raza .................. 370/395.41
7,558,270 B1 *  7/2009  Wilford et al. ......... 370/395.42

(Continued)

OTHER PUBLICATIONS

Davik et al., "IEEE 802.17 Resillient Packet Ring Tutorial," IEEE Communications Magazine, 42(3):112-118 (2004).

(Continued)

*Primary Examiner*—Ricky Ngo
*Assistant Examiner*—Paul Masur
(74) *Attorney, Agent, or Firm*—Marshall, Gerstein & Borun LLP (57) ABSTRACT

The present invention discloses a method for ensuring service classes of packet services, which includes limiting the rate of services with different service classes uploaded to a ringlet from an RPR station in accordance with the RPR physical packet lengths; monitoring, in real time, the rate of non-class A0 services uploaded to the ringlet from the RPR station and forwarded by the RPR station in accordance with the RPR physical packet lengths, and when the rate of the non-class A0 services exceeds the un-reserved rate of the RPR network, reporting a congestion message and adjusting the rate of the non-class A0 services uploaded to the ringlet from the RPR stations in the congestion domain. A method of rate limitation is also disclosed, by which rate limitation is conducted based on a Token Bucket according to the total length of the sent packet after encapsulation. The methods, by means of rate limitation and rate monitoring of the services uploaded to the ringlet from each RPR station according to the RPR physical packet length, can effectively overcome the shortcoming that the reserved bandwidth in the RPR can not be ensured because forwarded services unexpected occupy the bandwidth of the services uploaded to the ringlet at a downstream RPR station due to the physical layer encapsulation overhead.

11 Claims, 2 Drawing Sheets

U.S. PATENT DOCUMENTS

| | | | |
|---|---|---|---|
| 2003/0152084 A1* | 8/2003 | Lee et al. | 370/395.21 |
| 2003/0163593 A1* | 8/2003 | Knightly | 709/251 |
| 2004/0032826 A1* | 2/2004 | Sridhar | 370/222 |
| 2005/0100031 A1 | 5/2005 | Choe et al. | 370/404 |
| 2006/0007854 A1* | 1/2006 | Yu | 370/229 |
| 2006/0133406 A1* | 6/2006 | Homer et al. | 370/442 |

OTHER PUBLICATIONS

Robichaud et al., "Access Delay Performance of Resilient Packet Ring Under Bursty Periodic Class B Traffic Load," *IEEE International Conference*, 2:1217-1221 (2004).

Shi et al., "Research on Bandwidth Management Mechanism of Resillient Packet Ring," *Communications, Circuits and Systems and West Sino Expositions*, 1:763-766 (2002).

Supplementary European Search Report for Application No. EP06741900, dated Jul. 21, 2008.

Fang et al., "A New RPR Fairness Algorithm Based on Deficit Round Robin Scheduling Algorithm," Communications, Circuits and Systems (2004).

\* cited by examiner

METHOD FOR ENSURING SERVICE CLASS OF PACKET SERVICE AND METHOD OF RATE LIMITATION

CROSS-REFERENCE TO RELATED APPLICATIONS

This application is the U.S. national phase of International Application No. PCT/CN2006/001012 filed on May 17, 2006, which in turn, claims the benefit of Chinese Patent Application No. 200510117076.3 filed on Oct. 31, 2005, the entire disclosure of which is hereby incorporated by reference.

FIELD OF THE TECHNOLOGY

The present invention relates to packet oriented data transmission technologies, and more particularly, to a method for ensuring service class of a packet service on a Resilient Packet Ring (RPR) and a method of rate limitation based on a Token Bucket.

BACKGROUND OF THE INVENTION

RPR is a packet service oriented transmission technique, which effectively combines distinctive service features of telecommunications with data service oriented high efficiency bandwidth allocation, flexibility and expandability of Ethernet, and provides an optimized bandwidth management and a multi-priority packet transmission scheme with a high performance to cost ratio for operators.

Figure 1:
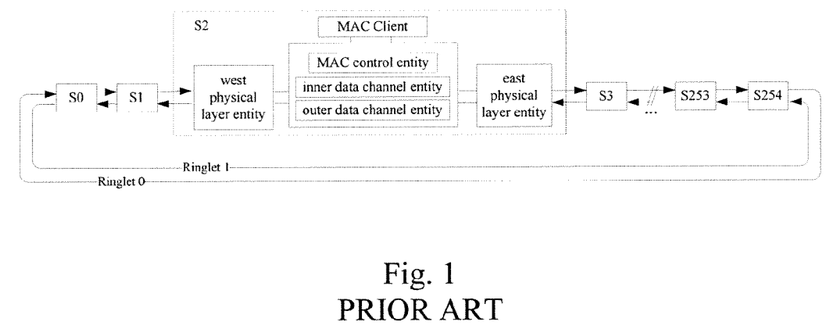
FIG. 1 is a schematic diagram illustrating the structure of a RPR network and the structure of one stations in the RPR network in the prior art.

FIG. 1 is a schematic diagram illustrating the structure of an RPR network and the structure of one station on the RPR in the prior art. As shown in FIG. 1, an RPR network is of double-ringlet structure with the ringlets rotating in the mutually inverse directions, comprising an inner ringlet (ringlet 1) and an outer ringlet (ringlet 0). The RPR network can support 255 stations interconnected, as S0~S254 shown in FIG. 1. Both the inner ringlet and the outer ringlet of the RPR can transmit and receive data frames. Each of the stations on the RPR includes a Medium Access Control (MAC) client, a physical layer entity and an MAC entity. The MAC entity further includes one MAC control entity, one inner data path entity associated with the inner ringlet and one outer data path entity associated with the outer ringlet. The physical layer entity further includes a west physical layer entity and an east physical layer entity. The outer ringlet receives data from the west physical layer entity and transmits data via the east physical layer entity, while the inner ringlet receives data from the east physical layer entity and transmits data via the west physical layer entity, thus the MAC client can receive and transmit data via either the inner ringlet or the outer ringlet.

For the RPR network, one of the key techniques to be realized is to provide different service classes for client entities and ensuring the quality of service (QoS) required by the protocol. According to the RPR protocol, the RPR MAC entity should provide three classes of data service: class A, class B, and class C, each of which has the following characteristics:

Class A service is a service with both an ensured bandwidth and an ensured jitter performance. Class A service in the RPR MAC entity can be further divided into class A0 service and class A1 service, wherein, the bandwidth of the class A0 service is reserved, and the bandwidth can not be occupied by services with other classes or services of other stations. This class of service is mostly used to carry real time services with strict requirements for bandwidth and jitter. The characteristic of class A1 service is that the bandwidth and jitter are both ensured while the bandwidth is not reserved. That is, if there is no data of class A1 service to be transmitted, the bandwidth of class A1 service can be reclaimed by services with other classes or/and services of other stations so that the usage rate of bandwidth is increased. However, the accessing delay of class A1 service is longer than that of class A0 service.

Class B service in the RPR MAC entity can be further divided into class B0 service and class B1 service, wherein, the bandwidth of class B0 service is ensured, and the delay and jitter of class B0 service is ensured to a limited degree. Class B0 service is also referred to as class B-CIR service within a promised accessing rate. If there is no data of class B0 service to be transmitted, the bandwidth of class B0 service can be reclaimed by services with lower classes. Class B1 service is a class B service with the rate thereof exceeding the promised rate, which is a best effort service. Class B1 service is also referred to as a class B-EIR service, none of whose bandwidth, jitter or delay is ensured.

Class C service is a best effort service, none of whose bandwidth, jitter or delay is ensured.

In order to ensure the transmission bandwidth of services with different classes transferred in the RPR network, the RPR network needs to implement rate limitation to services uploaded to the ringlets with different service classes, and this rate limitation is a necessary precondition to realize all the different service classes sharing the network resources based on the pre-assigned bandwidth. A specific method of rate limitation includes: precisely obtaining the physical layer link bandwidth; and allocating the physical layer bandwidth to different stations and corresponding classes according to pre-configured rules so as to ensure the total bandwidth configuration of all the services whose bandwidths need to be ensured is no larger than the physical layer link bandwidth, so that the corresponding bandwidths of different services can be ensured. Under the circumstances that all the bandwidths of different services are ensured, the requirements in terms of jitter and delay can be automatically ensured by the adjusting mechanism of the RPR MAC entity.

However, since RPR is a data link layer technique, the PRP protocol requires that the RPR be carried on different physical layer entities. At present, there are several physical layer techniques, such as Synchronous Digital Hierarchy (SDH)/Synchronous Optical Network (Sonet) and Gigabit Ethernet/10 Gigabit Ethernet (GE/10GE) to be chosen. The data transmission can be successfully realized by a special encapsulation of the RPR packet or by adding certain overheads to the RPR packet before transmitting data via the physical layer techniques described above. For example, in terms of the SDH technique, firstly a certain length of overhead will be encapsulated to the packet (a RPR packet for example) to be sent, then the packet will be mapped to a transmission time slot of SDH/Sonet. In terms of the GE/10GE technique, a Preamble and a Start Frame Delimiter (SFD) will be added to the packet to be sent before transmitting the packet. Due to the added physical layer overhead in the process of encapsulation, the actual bandwidth assigned to the RPR MAC entity is narrower than the promised bandwidth. The loss of the bandwidth will probably lead to the problem that services with lower service classes forwarded by a station occupy the bandwidth of services with higher service classes uploaded to the ringlet from this station when link congestion occurs. For example, in an application, a class B_CIR service forwarded by a station may probably occupy the bandwidth of a class A0 service uploaded to the ringlet from this station, or a class C service forwarded by a station may probably occupy the bandwidth of a class A0 service uploaded to the ringlet from this station, so that expected service classes can not be truly ensured.

SUMMARY OF THE INVENTION

The present invention provides a method for ensuring service classes of packet services, which may effectively avoid the situation that forwarded services with lower service classes occupy the bandwidth of services with higher service classes uploaded locally to a ringlet when link congestion occurs, so that expected service classes can be truly ensured.

The present invention also provides a method of rate limitation, by which the statistic rate of a packet service can be precisely controlled within a promised bandwidth.

According to the method for ensuring service classes of packet services of the present invention, each RPR station in the RPR network implements the following steps, respectively:

limiting the rate of services with different service classes uploaded to a ringlet from the RPR station in accordance with the respective RPR physical packet lengths; and monitoring, in real time, the rate of non-class A0 services uploaded to the ringlet from the RPR station and forwarded by RPR station in accordance with the respective RPR physical packet lengths, once the statistic rate of the non-class A0 services exceeds the un-reserved bandwidth of the RPR network, reporting a congestion message and adjusting, by the fair adjusted mechanism, the rate of non-class A0 services uploaded to the ringlet within the congestion domain.

The step of limiting the rate according to the RPR physical packet length includes: in the process of rate limitation adopting a Token Bucket, subtracting the length of the RPR physical layer encapsulation overhead of a RPR packet from the number of tokens in the current Token Bucket, each time after or before the RPR packet is sent.

The process of rate limitation adopting a Token Bucket includes: at the time of updating tokens of the Token Bucket, adding a preset number of tokens to the Token Bucket, and at the same time, confining the number of the tokens in the Token Bucket to a number less than or equal to a preset high threshold; while sending a RPR packet, each time after transmitting n bytes of the RPR packet (n is less than or equal to 256), subtracting the number of the sent bytes from the number of tokens in the Token Bucket; and when the number of tokens in the current Token Bucket is less than or equal to a preset low threshold, stopping transmitting the current RPR packet.

The step of monitoring the rate of non-class A0 services uploaded to the ringlet from the RPR station or forwarded by the local station includes: obtaining a statistic rate of all non-class A0 services forwarded by the RPR station or uploaded to the ringlet from the local station in accordance with respective RPR physical packet lengths of services with different service classes; in the process of obtaining the statistic rate, adding the length of the RPR physical layer encapsulation overhead of the sent packet to the statistic rate of all non-class A0 services each time before or after forwarding a packet of non-class A0 services; and adding the length of the RPR physical layer encapsulation overhead of the sent packet to the statistic rate of all non-class A0 services each time before or after transmitting a packet of non-class A0 services uploaded to the ringlet from the local station.

According to the method of rate limitation of the invention, a Token Bucket limits the rate in accordance with the physical packet length of the sent packet processed by a next logic layer encapsulation; and in the process of rate limitation, after or before transmitting the current packet, subtracting the length of the overhead used for encapsulating the packet in the next logic layer from the current number of tokens in the Token Bucket.

The process of rate limitation includes: at the time of updating tokens of the Token Bucket, adding a preset number of tokens to the Token Bucket, and at the same time confining the number of tokens in the Token Bucket to a number less than or equal to a preset high threshold; while sending a packet, subtracting the number of the bytes of the packet from the current number of tokens in the Token Bucket; and when the current number of tokens in the Token Bucket is less than or equal to a preset low threshold, stopping transmitting the packet.

As can be seen from the above, in the method according to the present invention, rate limitation is implemented to services uploaded to the ringlets from each station according to the physical packet length of each RPR packet and the rate monitoring is implemented for each non-class A0 service uploaded to the ringlets from each station or forwarded by each station according to the physical packet length of the RPR packet, which may effectively overcome the drawback of forwarded services occupying the bandwidth of the services uploaded from downstream stations, which makes it impossible to guarantee the reserved bandwidth, due to the physical layer encapsulation overhead in an RPR network.

In addition, the technical scheme put forward by the present invention is applicable to packets with random lengths, making it possible to allocate bandwidth in accordance with that of physical link without considering the bandwidth loss resulting from different packet lengths, and ensuring that each station obtains expected bandwidth of physical link assigned.

DETAILED DESCRIPTION OF THE EMBODIMENTS

A detailed description of the present invention will be given hereinafter according to the accompanying drawings and embodiments.

The RPR physical layer encapsulation overhead always exists no matter whether the RPR packet is carried in the physical layer by the GE technology or the SDH/Sonet technology, and the RPR physical layer encapsulation overhead will make the actual bandwidth which the RPR MAC entity can obtain less than the promised bandwidth. And at the same time, due to random lengths of the RPR packets, the bandwidth loss is unable to be calculated precisely. So it is difficult to allocate the bandwidth of the entire RPR network according to the actual bandwidth that can be obtained by the RPR MAC entity.

An embodiment of the present invention provides a method for ensuring the service classes on the RPR network, of which the main idea is to precisely limit the physical link bandwidth actually occupied by various services uploaded from each station in the RPR network within the promised bandwidth assigned, so that all the stations can be ensured to obtain the pre-assigned physical link bandwidth.

In order to implement the method mentioned above, first, a concept of RPR physical packet length is put forward, the meaning of which is that: in the RPR MAC entity, in view of each packet to be uploaded or to be forwarded, when the rate limitation and rate monitoring is implemented, the physical packet length with an added RPR physical layer encapsulation overhead is taken as the length of the packet. That is, the RPR physical packet length equals to a RPR packet length plus an RPR physical layer encapsulation overhead.

The result of rate limitation and rate monitoring in accordance with the RPR physical packet length mentioned above is that: an RPR physical layer encapsulation overhead is further considered while performing rate limitation or rate monitoring to each RPR packet in the RPR MAC entity, thus the physical link bandwidths actually occupied by different services are made accurately matched with the promised bandwidth allocated for them, so that all the physical rates of the services uploaded to the ringlet can be precisely limited to the pre-assigned bandwidths, which effectively solves the problem that the forwarded services unexpectedly occupy the bandwidth of services uploaded to the ringlet.

Figure 2:
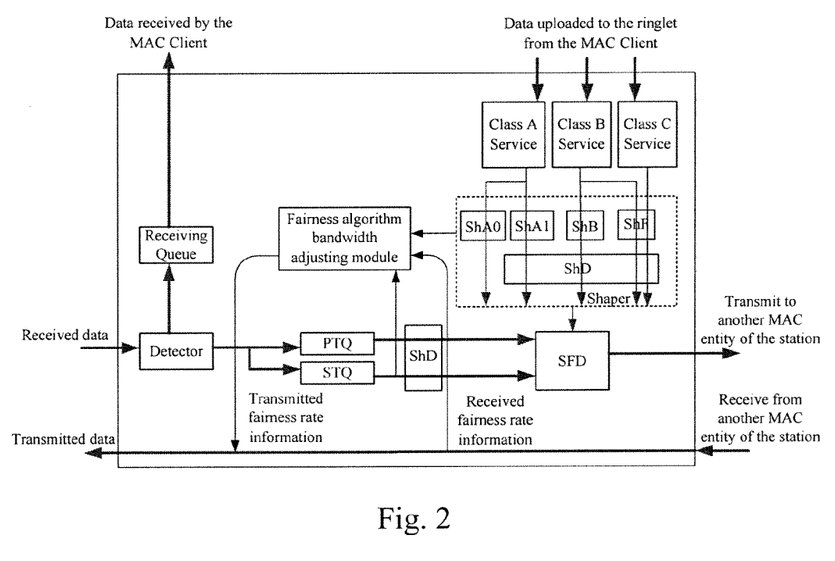
FIG. 2 is a schematic diagram illustrating the structure of the MAC entity on one ringlet of each station in the RPR network according to an embodiment of the present invention.

FIG. 2 is a schematic diagram illustrating the structure of the MAC entity in one ringlet of each station in the RPR network according to one embodiment of the present invention. Each station in the RPR network includes two MAC entities correlated respectively to the two different ringlets as shown in FIG. 2. The data uploaded to the ringlet from the MAC client in the local station include services of three classes, class A service, class B service and class C service. Rate limitations to the three services are implemented by a rate limitation shaper shown in the dotted block in FIG. 2, and then the services are outputted to a Schedule Forwarding Dispatch (SFD) which was used for allocating bandwidth for the services forwarded and uploaded to the ringlet. The data received from the ringlet corresponding to this MAC entity of the RPR network is first inputted into a detector module, in which the data to be received by this station and the data to be forwarded by this station were separated. And the data to be received by this station is inputted to a receiving queue to be outputted to the MAC client, while the class A service data to be forwarded are outputted to a Primary Transfer Queue (PTQ), and the class B and class C service data to be forwarded are outputted to a Second Transfer Queue (STQ), then the service data to be forwarded in the PTQ and STQ is output to the SFD which is used to allocate bandwidths to services to be forwarded and services uploaded to the ringlet. The SFD allocates bandwidths for the services uploaded to the ringlet after implementing the rate limitation by the shaper and the services to be forwarded from the PTQ and STQ. After the bandwidth allocation, service flows of various service classes are transmitted onto the RPR network via the MAC entity of this station on the other ringlet.

As shown in FIG. 2, the MAC entity in one ringlet contained in an RPR network station further includes: a fairness algorithm bandwidth adjusting module, which is used for receiving fairness rate information from a downstream station, producing new fairness rate information according to the congestion situation of this station or forwarding the received fairness rate information, and reporting the fairness rate information to the upstream station. The adjusting performed by the fairness algorithm bandwidth adjusting module includes: monitoring in real time the statistic rate of all non-class A0 services forwarded by the station and/or uploaded to the ringlet from the station, and once the statistic rate of all non-class A0 services exceeds the un-reserved bandwidth which is set by the system, reporting a congestion message to adjust fairly and dynamically the rate of the class C services and class B_EIR services uploaded to the ringlet. The purpose of the fairness algorithm bandwidth adjusting mentioned above, namely, the rate monitoring, is to decide properly whether the station is congested or not so as to adjust the class C and class B1 service flows of the upstream station with the fairness algorithm so that the bandwidth of all the non-class A0 services would not exceed the un-reserved bandwidth.

The SFD in FIG. 2 is used to dispatch the services uploaded to the ringlet after rate limitation of Shaper and services from the PTQ and STQ to be forwarded. The dispatch in a preferred embodiment of the present invention adopts the following strategies:

1. A logical data queue STAGE will be established after the class A, class B and lass C services uploaded to the ringlet are put together, which will compete for the physical link bandwidth with the forwarded data.

2. The priority order of the PTQ, STQ and STAGE queues in occupying the physical link bandwidth is:

The PTQ has an absolute priority, which means that the bandwidth of the forwarded class A service should be first ensured as long as there is class A service.

The STQ and STAGE are relative in priority. The STAGE data have high priority when the queue threshold of the STQ is less than a preset overflow limit, while the STQ data have higher priority when the queue threshold of the STQ is larger than the overflow limit. That is to say, both the data forwarded and uploaded to the ringlet can be dispatched when the physical data link bandwidth is sufficient and congestion does not occur. However, if congestion occurs in the physical layer because of a large traffic of data forwarded on and uploaded to the ringlet, the forwarded PTQ and STQ data have to be dispatched first, i.e. priority is given to forwarded data while the data uploaded to the ringlet have to be stopped temporarily.

3. For the service uploaded to the ringlet, the priorities of class A services are higher than class B services and the priorities of class B services are higher than class C services.

In a preferred embodiment of the invention, the shaper for rate limitation shown in FIG. 2 is implemented by a Token Bucket. The working principle of the Token Bucket is: on one hand, tokens are added to the Token Bucket periodically, on the other hand, the number of tokens in the Token Bucket is decreased in accordance with the length of each packet sent. In the process of transmitting a packet, if the number of tokens in the Token Bucket is less than a preset low threshold, a flow control indication signal is sent to the MAC client entity and the transmission of the current packet will be stopped. When the number of tokens in the Token Bucket exceeds the low threshold mentioned above, cancel the flow control indication signal mentioned above, and permit the MAC client entity to continue transmitting the current packet, thus the object of rate limitation is attained.

According to the advice of the RPR standard, a Token Bucket includes 6 parameters: the number of tokens in Token Bucket "credit", the number of added tokens in each Token period "incSize", the token updating period "interval", the high limit, the low limit and the flow control indication signal "sendX". It is easy to conclude that the actual average limited rate by a rate limitation of the Token Bucket is incSize/interval and the maximum burst rate is (high limit-low limit)/ interval. Thus it can be seen that different rates can be obtained by simply changing the parameter incSize or interval.

As shown in FIG. 2, different shapers with different promised bandwidths will be used for limiting the rate of services with different service classes uploaded to the ringlet, so that different service bandwidths can be obtained by different services after the rate limitation. For example, Shaper ShA0 and Shaper ShA1 are used to limit the rates of class A0 service and class A1 service respectively; Shaper ShB and Shaper ShF are used to limit the rates of class B0 service and class B1 service respectively; and Shaper ShF will also be used to limit the rate of class C service. By using different shapers, different bandwidths with different rates can be obtained by services with different service classes. Besides, the rate of non-class A0 services uploaded to the ringlet and non-class A0 service forwarded will be limited by a Shaper ShD. In a preferred embodiment of the invention, the rate limited by Shaper ShD is configured to be the physical link bandwidth minus a sum of the reserved bandwidth of forwarded class A0 services and the reserved bandwidth of class A0 services uploaded to the ringlet, namely, the un-reserved bandwidth of the PRR network. In this way, the reserved bandwidth for class A0 services can be relatively ensured at the time of link congestion.

In the preferred embodiments of the present invention, the different shapers mentioned above implement rate limitation according to the RPR physical packet length. The process of rate limitation by the shapers includes the following steps:

A1. Judging whether it is time for token updating, if it is, add tokens of incSize in number to the Token Bucket and at the same time confine the number of tokens in the Token Bucket below the pre-set high limit, namely, make credit=Min(high limit(credit+incSize));

Wherein, the function Min( ) indicates an operation of selecting a minimum value.

A2. Judging whether there is any packet to be sent, if there is, each time after sending n (n≦256) bytes, subtract tokens with a number of the sent bytes, namely, credit=credit−n;

A3. Judging whether the current packet is sent completely, if it is, subtract the length of RPR physical layer encapsulation overhead link_oh from the number of tokens, namely, credit=credit−link_oh;

The RPR physical layer encapsulation overhead link_oh mentioned in the above step is related to the adopted encapsulation technique. For example, when the RPR packet is transmitted by the SDH technique, the RPR physical layer encapsulation overhead link_oh is 12 bytes if GFP encapsulation technique is used, while the RPR physical layer encapsulation overhead link-oh is 9 bytes if LAPS or HDLC encapsulation technique is used, and when the GE technique is adopted, the RPR physical layer encapsulation overhead link_oh is 20 bytes.

Alternatively, in this step, the RPR physical layer encapsulation overhead link_oh could be subtracted from the number of tokens in the Token Bucket right before the transmission of the current packet is started rather than when the transmission of the packet is completed.

A4. Judging whether the current credit is less than or equal to the low limit, if it is, the flow control indication signal sendX will be sent to the MAC client, and at the same time stop transmitting the corresponding class traffic.

According to a preferred embodiment of the present invention, sendX can be configured to be 1 to indicate that transmission of the traffic may be continued and configured to be 0 to indicate that transmission of the corresponding class traffic should be stopped. Obviously, the value can be set reversely.

For the Shaper ShD which implements rate limitation to non-class A0 services uploaded to the ringlet and non-class A0 services to be forwarded according to the RPR physical packet length of different non-class A0 services, while implementing the above steps A1~A4, each time after forwarding n bytes, the number of n (n≦256) will be subtracted from the tokens in the Token Bucket; and the length of a RPR physical layer encapsulation overhead of a RPR packet will be subtracted from the tokens in the Token Bucket when the transmission of the RPR packet is completed or before starting to transmit the packet. When detecting that the number of tokens is less than or equal to the low limit mentioned above, only the transmission of the non-class A0 traffic uploaded to the ringlet from this station is stopped, the forwarding of the RPR packets from this station will not be stopped.

It can be seen from the process of the rate limitation mentioned above, in the process of the rate limitation implemented by an appropriate shaper, additional tokens of the number corresponding to the length of a RPR physical layer encapsulation overhead link-oh will be used by each RPR packet uploaded to the ringlet. Thus, when the RPR packet after rate limitation by the shaper reaches the physical layer, the actual physical link bandwidth occupied by the RPR packet and the RPR physical layer encapsulation overhead of each packet will just equal to the promised bandwidth configure for the Shaper. In this way, the problem that too much bandwidth of the physical link is unexpectedly occupied is avoided, and all stations can be ensured to obtain the pre-assigned physical link bandwidth by accurately controlling the rate of uploading services on each station of the RPR network not to exceed the bandwidth of the physical link pre-assigned for them.

Now, the method for rate limitation in a preferred embodiment of the present invention will be explained in detail by a specific example with reference to FIG. 3.

Figure 3:
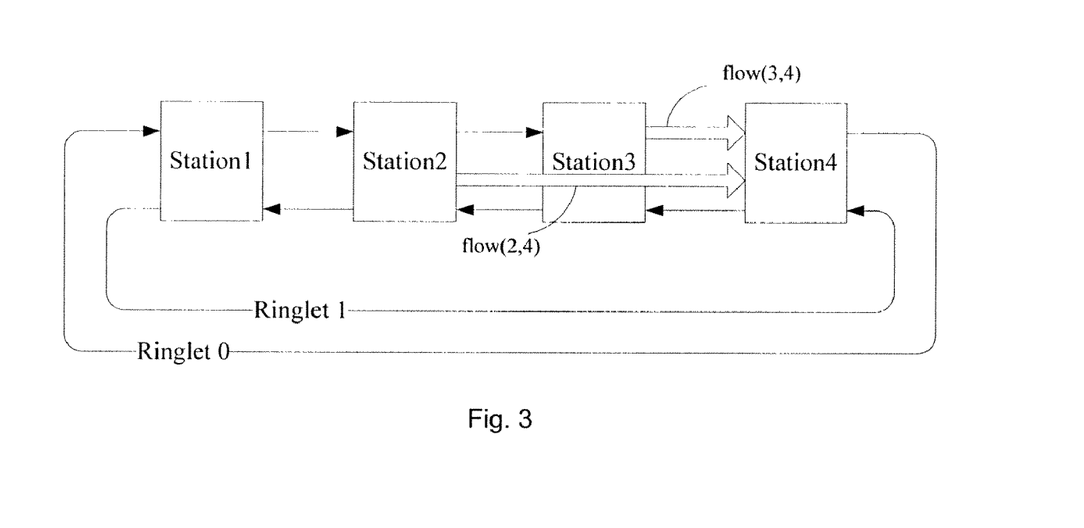
FIG. 3 is a schematic diagram illustrating a RPR network adopting a GE interface.

As shown in FIG. 3, there are 4 stations in the RPR network, and a GE interface is adopted by the physical layer of the RPR network, the physical link bandwidth is 1 Gbps, and the minimum frame interval is 96 bit, which equals to a length of the RPR physical layer encapsulation overhead of 20 bytes. In this embodiment, Station 2 expects to transmit a class B_CIR service to Station 4 with the rate of 500 Mbps, shown as flow (2,4) in FIG. 3, with the assumption that the length of each RPR packet to be sent is 64 bytes. Furthermore, Station 3 also expects to transmit a class A0 service to Station 4 with the reserved bandwidth of 500 Mbps, shown as flow (3,4) in FIG. 3, also with the assumption that the length of each RPR packet to be sent is 64 bytes.

According to the requirement for bandwidth mentioned above and the RPR protocol, the promised bandwidth of Shaper ShB of Station 2 used to limit the rate of class B_CIR services will be configured to be 500 Mbps, and the promised bandwidth of Shaper ShD of Station 2 used to limit the rate of non-class A0 services uploaded to the ringlet will be configured to be 500 Mbps; while the promised bandwidth of Shaper ShA0 of Station 3 used to limit the rate of class A0 services will be configured to be 500 Mbps, and the promised bandwidth of Shaper ShD of Station 3 used to limit the rate of forwarding non-class A0 services will be configured to be 500 Mbps. The flow (3,4) is the reserved bandwidth for class A0 service, which needs to be absolutely ensured.

If the shapers of the Stations 2 and 3 mentioned above implement rate limitation not according to the length of the RPR physical packet but to the actual length of the RPR packet to be sent, since the data packet sent in the physical path has Frame interval, Preamble and SFD, each packet will be added 20 bytes of overhead after flow (2,4) is sent to the physical path, so that the actual physical link bandwidth occupied by flow (2,4) between Stations 2 and 4 will become 500×(64+20)/64=656 Mbps. However, since flow (2,4) needs to be forwarded by Station 3 in order to reach Station 4, that is to say, flow (2,4) is a forwarded service at Station 3. It can be known from the dispatch strategy mentioned before, the priority of a forwarded service is higher than that of the services uploaded to the ringlet when the link is congested, and that is to say, the bandwidth of the forwarded service needs to be ensured first by the stations on the RPR network. As a result, the physical link bandwidth obtained by services uploaded to the ringlet and forwarded from station 3 to station 4, such as flow (3,4), can only obtain a bandwidth of 1000−656=344 Mbps, which is much less than the expected bandwidth, and the bandwidth reserved for the flow (3,4) of the class A0 service uploaded to the ringlet from Station 3 can not be ensured.

However, according to the method of the preferred embodiments of the invention, shapers of Stations 2 and 3 implement rate limitation in accordance with the length of the RPR physical packet of each RPR packet to be sent. Since the RPR physical layer encapsulation overhead has been considered in the process of rate limitation by each shaper, no matter how the length of the RPR packet changes randomly, the actual physical link bandwidth occupied by flow (2,4) service that is sent from Station 2 to Station 4 will be accurately confined within 500 Mbps. As a result, the two service flows can reasonably occupy the pre-assigned physical link bandwidth as expected.

In order to satisfy the bandwidth requirement of each service in the RPR network and realize different service quality for services with different classes, each station of the RPR network not only implements rate limitation for each service uploaded to the ringlet but also allocates, fairly and dynamically, the un-reserved bandwidth resources to each station which competes for the physical link bandwidth resources by the fairness algorithm bandwidth adjusting module illustrated in FIG. 2, ensuring that the statistic rate of the non-class A0 service does not exceed the un-reserved bandwidth ureservedRate, Without this operation of fair allocation, the reserved bandwidth for the class A0 service can not be ensured. The un-reserved bandwidth here refers to the difference between the RPR physical link bandwidth and the reserved bandwidth for the class A0 service.

In a preferred embodiment of the present invention, the fairness algorithm bandwidth adjusting module shown in FIG. 2 will be mainly used for monitoring in real time the statistic rate nrXmitRate of all non-class A0 services forwarded by this station and uploaded to the ringlet from this station, if the statistic rate nrXmitRate of the non-class A0 services exceeds the un-reserved bandwidth ureservedRate, a congestion message will be reported so that the rate of the class C and class B_EIR services uploaded to the ringlet in the congestion domain will be fairly and dynamically adjusted, and the object that the bandwidth occupied by non-class A0 services does not exceed the un-reserved bandwidth can be achieved.

In order to obtain an accurate statistic bandwidth of the physical link occupied by all non-class A0 services, the statistic rate nrXmitRate of all non-class A0 services will be obtained by the fairness algorithm bandwidth adjusting module mentioned in the preferred embodiment of the invention according to the RPR physical packet length of all non-class A0 services, and the specific method includes the following two parallel processes, B1~B2 and C1~C2:

B1: Judge whether the RPR packet uploaded to the ringlet from this station is a class A0 service packet, if it is not, add n to the statistic rate of all non-class A0 services nrXmitRate each time after transmitting n effective bytes, i.e. nrXmitRate=nrXmitRate+n, and then proceed to B2; otherwise, return to step B1.

B2: After the current non-class A0 service packet is transmitted (or before transmitting the current non-class A0 service packet), add the length of the RPR physical layer encapsulation overhead link_oh to the statistic rate of all non-class A0 services nrXmitRate, i.e. nrXmitRate=nrXmitRate+link_oh; and otherwise, return to step B1;

C1: Judge whether the current forwarded RPR packet is a class A0 service packet, if it is not, add n to the statistic rate of all non-class A0 services nrXmitRate each time after transmitting n effective bytes, namely, nrXmitRate=nrXmitRate+n, and then proceed to C2; otherwise, return to step C1;

C2: After the current non-class A0 service is forwarded (or before it is forwarded), add the length of the RPR physical layer encapsulation overhead link_oh to the statistic rate of all non-class A0 services nrXmitRate, namely, nrXmitRate=nrXmitRate+link_oh; and otherwise, return to step C1;

Now, a detailed introduction of the fairness algorithm bandwidth adjusting method mentioned in the preferred embodiment of the present invention will be given with reference to another embodiment and FIG. 4.

Figure 4:
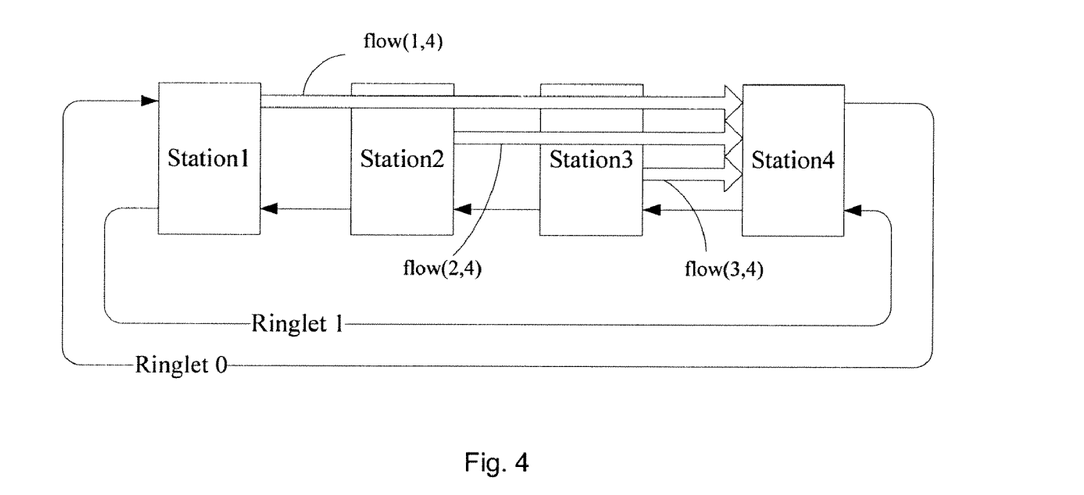
FIG. 4 is a schematic diagram illustrating a RPR network using SDH with a rate of 622 Mbps as the physical layer thereof.

FIG. 4 is a schematic diagram of the RPR network of which the physical layer adopts SDH technology with a rate of 622 Mbps. Under this rate class, after the section overhead (SOH) and the path overhead (POH) are excluded, the actual data bandwidth is about 600 Mbps, if the encapsulation technique adopted is the GFP encapsulation with frame checking sequence (FCS), the length of the physical layer encapsulation overhead is 12 bytes. In this embodiment, Station 1 and Station 2 each expects to transmit a class C service to Station 4 with a bandwidth of 200 Mbps, shown as flow (1,4) and flow (2,4) in FIG. 4; and Station 3 expects to transmit a class A0 service with a bandwidth of 200 Mbps to Station 4 shown as flow (3,4) in FIG. 4.

According to the rate requirement mentioned above and the RPR protocol, the promised rate of the Shaper ShD of Stations 1 and 2 should be configured to be 400 Mbps, namely, the un-reserved bandwidth is 400 Mbps. In practical applications, flow (1,4) and flow (2,4) will share the un-reserved bandwidth of 400 Mbps through the adjustment made by the fairness algorithm bandwidth adjusting module in Station 2. For the convenience of description, assume the length of each RPR packet sent by each station is 64 bytes.

If the fairness algorithm bandwidth adjusting module in the station on the RPR network implements the adjusting according to the actual length of the RPR packet other than the length of the RPR physical packet, then, although Station 2 can confine the sum of bandwidths of the services uploaded to the ringlet of flow (1,4) and flow (2,4) within 400 Mbps, the actual physical link bandwidth occupied by these two data flows will turn to be 400×(64+12)/64=475 Mbps. Because flow (1,4) and flow (2,4) need be forwarded via Station 3 so as to reach Station 4, the physical link bandwidth that Station 3 can obtain is only 600−475=125 Mbps, which is much less than the expected bandwidth reserved for the service of class A0, for example flow (3,4), uploaded to the ringlet from station 3, thus the reserved bandwidth can not be ensured.

However, according to the method mentioned in the preferred embodiment of the present invention, the fairness algorithm bandwidth adjusting module in the station of the RPR network implements the adjustment according to the physical length of the RPR packet, thus when monitoring the rate of non-class A0 services, Station 2 will take the RPR physical layer encapsulation overhead of each packet into consideration so that, no matter how the length of RPR packet changes randomly, the sum of the physical link bandwidth of flow (1,4) and flow (2,4) getting to the physical layer will not exceed 400 Mbps, so the reserved bandwidth of 200 Mbps between Station 3 and 4 can be effectively ensured.

It can be seen from the preferred embodiments of the present invention, the rate limitation according to the RPR physical packet length of the RPR packet and the fairness algorithm bandwidth adjusting module can effectively overcome the drawback, caused by the RPR physical layer encapsulation overhead, that the forwarded services may unexpected occupy the bandwidth of services uploaded to the ringlet in the RPR network and that the reserved bandwidth can not be ensured.

In addition, it is appreciated by those skilled in the art that the method for rate limitation mentioned in the present invention is applicable not only to a RPR network, but to other bandwidth control techniques using the Token Bucket. For example, for the data service processing layer higher than the RPR in the network hierarchy, if the client set a Commitment Access Rate (CAR) for a certain class B service to be 20 Mbps, the method of rate limitation according to this invention should be used to limit the rate of this class B service so as to ensure that the bandwidth occupied by this class B service is within 20 Mbps.

For this purpose, it is needed to extend the concept of the physical packet length, making the physical packet length represented as the sum of the length of the packet to be sent and the length of the encapsulation overhead in the next logical layer after encapsulation. In this way, rate limitation can be implemented according to the physical packet length of a service; which mainly includes the steps of:

At the time of updating tokens in the Token Bucket, a preset number of tokens is added to the Token Bucket, and at the same time, the number of the tokens in the Token Bucket is confined to a number less than or equal to a preset high limit of tokens.

At the time of sending a packet, the number of tokens of the Token Bucket is subtracted by the number of sent bytes of the packet.

Further subtract the encapsulation overhead length used to encapsulate the packet in the next logical layer from the number of tokens in the Token Bucket before or after the packet is sent.

The sending of the packet will be stopped if the number of tokens in the Token Bucket is less than or equal to a preset low limit of tokens.

As can be seen from the method mentioned above, in the process of the rate limitation, additional tokens with the number equal to the length of encapsulation overhead in the next logical layer will be used by each packet that is sent, in this way, at the time that the packet after the above rate limitation gets to the next logical layer, the bandwidth occupied by the packet plus the encapsulation overhead of the next logical layer will be just equal to the promised bandwidth of this Token Bucket so that the bandwidth competing by various services could be avoided.

The invention claimed is:

1. A method for ensuring service classes of packet services, wherein each Resilient Packet Ring (RPR) station of an RPR network performs the following process, respectively:

limiting the rate of services with different service classes uploaded to a ringlet from the RPR station, respectively, in accordance with the RPR physical packet lengths, wherein the RPR physical packet length is the sum of the length of an RPR packet and the length of an RPR physical layer encapsulation overhead; and obtaining a statistic rate of all non-class A0 services forwarded by the RPR station and uploaded to the ringlet from the RPR station, wherein in the process of making rate statistics, the length of the RPR physical layer encapsulation overhead of the sent packet is added to the statistic rate of all non-class A0 services each time after or before forwarding a packet of non-class A0 service, and the length of the RPR physical layer encapsulation overhead of the sent packet is added to the statistic rate of all non-class A0 services each time after or before transmitting the packet of the non-class A0 service uploaded to the ringlet from the RPR station, when the statistic rate of the non-class A0 services exceeds the un-reserved rate of the RPR network, reporting a congestion message and adjusting the statistic rate of non-class A0 services uploaded to the ringlet within a congestion domain.

2. The method according to claim 1, wherein the process of limiting the rate of services with different service classes in accordance with the RPR physical packet lengths comprises:

in the process of rate limitation adopting a Token Bucket, subtracting the length of the RPR physical layer encapsulation overhead from the current number of tokens in the Token Bucket each time after one RPR packet is sent.

3. The method according to claim 2, wherein the process of rate limitation adopting a Token Bucket comprises:

at the time of updating tokens of the Token Bucket, adding a preset number of tokens to the Token Bucket, and at the same time, confining the number of the tokens in the Token Bucket to a number less than or equal to a preset high limit of tokens;

while sending an RPR packet, each time after transmitting n bytes of the RPR packet, wherein n is less than or equal to 256, subtracting n from the number of tokens in the Token Bucket; and when the current number of tokens in the Token Bucket is less than or equal to a preset low limit of token, stopping transmitting corresponding class traffic.

4. The method according to claim 1, wherein the process of limiting the rate of services with different service classes in accordance with the RPR physical packet lengths comprises:

in the process of rate limitation adopting a Token Bucket, subtracting the length of the RPR physical layer encapsulation overhead from the current number of tokens in the Token Bucket each time before one RPR packet is sent.

5. The method according to claim 4, wherein the process of rate limitation adopting a Token Bucket comprises:

at the time of updating tokens of the Token Bucket, adding a preset number of tokens to the Token Bucket, and at the same time, confining the number of the tokens in the Token Bucket to a number less than or equal to a preset high limit of token;

while sending an RPR packet, each time after transmitting n bytes of the RPR packet, wherein n is less than or equal to 256, subtracting n from the number of tokens in the Token Bucket; and when the current number of tokens in the Token Bucket is less than or equal to a preset low limit of token, stopping transmitting the corresponding class traffic.

6. The method according to claim 1 wherein the process of making rate statistics comprises:
  when the currently forwarded RPR packet is a non-class A0 service packet, adding n to the statistic rate of all non-class A0 services each time after forwarding n effective bytes, wherein n is less than or equal to 256; and
  when the current RPR packet uploaded to the ringlet from the RPR station is a non-class A0 service packet, adding n to the statistic rate of all the non-class A0 services each time after transmitting n effective bytes.

7. The method according to claim 1, wherein the process of making rate statistics comprises:
  when the currently forwarded RPR packet is a non-class A0 service packet, adding n to the statistic rate of all non-class A0 services each time after forwarding n effective bytes, wherein n is less than or equal to 256; and
  when the current RPR packet uploaded to the ringlet from the RPR station is a non-class A0 service packet, adding n to the statistic rate of all the non-class A0 services each time after transmitting n effective bytes.

8. The method according to claim 1, wherein the process of adjusting the rate of non-class A0 services uploaded to the ringlet from the RPR stations within the congestion domain comprises:
  adjusting the rate of class C services and class B_EIR services uploaded to the ringlet from the RPR stations within the congestion domain.

9. The method according to claim 1, after the process of limiting the rate of services, further comprising:
  limiting the rate of all non-class A0 services uploaded to the ringlet from the RPR station and forwarded by the RPR station in accordance with the RPR physical packet lengths, and limiting the sum of the physical link bandwidths of all non-class A0 services within the un-reserved bandwidth of the RPR network.

10. The method according to claim 9, wherein the process of limiting the rate in accordance with the RPR physical packet lengths comprises:
  in the process of rate limitation adopting the Token Bucket, each time before or after transmitting or forwarding a non-class A0 service packet, subtracting the length of the RPR physical layer encapsulation overhead of the non-class A0 service from the number of tokens in the Token Bucket, and when detecting that the number of tokens in the Token Bucket is less than or equal to the low limit of token, stopping transmitting the non-class A0 services uploaded to the ringlet from the RPR station.

11. A method of rate limitation, comprising:
  a Token Bucket conducting rate limitation in accordance with the physical packet length of the sent packet after being encapsulated by a next logical layer, wherein the physical packet length refers to the sum of the length of the packet to be sent and the length of the encapsulation overhead of the packet in next logical layer;
  after or before transmitting the current packet to be transmitted, subtracting the length of the overhead used for encapsulating the packet by the next logical layer from the current number of tokens in the Token Bucket;
  at the time of updating tokens of the Token Bucket, adding a preset number of tokens to the Token Bucket, and confining the number of tokens in the Token Bucket to a number less than or equal to a preset high limit of token;
  while sending a packet, subtracting the number of the bytes of the sent packet from the number of tokens in the Token Bucket; and
  when the current number of tokens in the Token Bucket is less than or equal to a preset low limit of token, stopping sending the corresponding traffic.

* * * * *